US010812938B2

(12) United States Patent
Sanchez et al.

(10) Patent No.: US 10,812,938 B2
(45) Date of Patent: *Oct. 20, 2020

(54) SENDING LOCATION INFORMATION FROM WITHIN A COMMUNICATION APPLICATION (71) Applicant: BlackBerry Limited, Waterloo (CA)

(72) Inventors: Thomas Sanchez, Colleyville, TX (US); Piotr Konrad Tysowski, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 133 days.

This patent is subject to a terminal disclaimer.

(21) Appl. No.: 16/049,339

(22) Filed: Jul. 30, 2018

(65) Prior Publication Data
US 2018/0343537 A1 Nov. 29, 2018

Related U.S. Application Data (63) Continuation of application No. 15/357,825, filed on Nov. 21, 2016, now Pat. No. 10,038,969, which is a (Continued)

(51) Int. Cl.
G01C 21/20 (2006.01)
G01C 21/34 (2006.01)
(Continued)

(52) U.S. Cl.
CPC ............ H04W 4/029 (2018.02); G01C 11/34 (2013.01); G01C 21/30 (2013.01); G01S 19/13 (2013.01);
(Continued)

(58) Field of Classification Search
CPC ........ G01C 21/26; G01C 21/30; G01C 21/34; G01C 11/34; G06F 3/00; G06F 3/0484;
(Continued)

(56) References Cited

U.S. PATENT DOCUMENTS 6,563,459 B2 5/2003 Takenaga
6,714,791 B2 3/2004 Friedman
(Continued)

FOREIGN PATENT DOCUMENTS

EP 1045532 10/2000
EP 1081901 3/2001
(Continued)

OTHER PUBLICATIONS

Extended European Search report dated Feb. 28, 2012 for corresponding application No. 11194905.3.
(Continued)

Primary Examiner — Yonel Beaulieu
(74) Attorney, Agent, or Firm — Donna Flores; Fleit Intellectual Property Law (57) ABSTRACT A method in a wireless communications device for transmitting current location information representing a current location of the wireless communications device. The method entails, from within a communication application executing on a processor of the wireless communications device, causing the wireless communications device to obtain the current location information representing the current location of the wireless communications device, including the current location information in a communication generated from within the communication application, and transmitting the communication that includes the current location information. The method optionally entails a further step of performing a reverse look-up of GPS coordinates representing the current location to determine address information for including in the communication. Location information, such as maps or URLs to maps can be sent directly from an e-mail application or instant messenger without having to separately launch a mapping application.

15 Claims, 8 Drawing Sheets

Related U.S. Application Data continuation of application No. 14/733,518, filed on Jun. 8, 2015, now Pat. No. 9,503,859, which is a continuation of application No. 14/142,918, filed on Dec. 29, 2013, now Pat. No. 9,055,402, which is a continuation of application No. 13/665,051, filed on Oct. 31, 2012, now Pat. No. 8,620,583, which is a continuation of application No. 13/330,465, filed on Dec. 19, 2011, now Pat. No. 8,315,800, which is a continuation of application No. 11/923,940, filed on Oct. 25, 2007, now Pat. No. 8,086,398.

(51) Int. Cl.
  *G01C 21/30* (2006.01)
  *G01S 19/13* (2010.01)
  *H04L 5/08* (2006.01)
  *H04W 4/12* (2009.01)
  *H04W 4/029* (2018.01)
  *G01C 11/34* (2006.01)
  *G06F 3/0484* (2013.01)
  *H04W 4/02* (2018.01)
  *H04L 12/58* (2006.01)

(52) U.S. Cl.
  CPC ...... *G06F 3/04842* (2013.01); *G06F 3/04847* (2013.01); *H04L 51/08* (2013.01); *H04W 4/025* (2013.01); *H04W 4/12* (2013.01)

(58) Field of Classification Search
  CPC ......... H04W 4/00; H04W 4/02; H04W 4/025; G01S 19/00; G01S 19/13; H04L 5/00; H04L 5/18
  See application file for complete search history.

(56) References Cited

U.S. PATENT DOCUMENTS

| | | | | |
|---|---|---|---|---|
| 6,888,936 | B1 * | 5/2005 | Groen | H04M 3/42 |
| | | | | 379/142.1 |
| 6,973,298 | B2 * | 12/2005 | Chang | G01S 5/0027 |
| | | | | 455/404.2 |
| 7,899,468 | B2 | 3/2011 | Lohtia et al. | |
| 9,020,542 | B2 | 4/2015 | McConnell | |
| 9,232,403 | B2 * | 1/2016 | Raleigh | H04L 67/145 |
| 9,253,663 | B2 * | 2/2016 | Raleigh | H04W 24/02 |
| 9,319,913 | B2 * | 4/2016 | Raleigh | H04L 12/14 |
| 9,351,193 | B2 * | 5/2016 | Raleigh | G06Q 40/12 |
| 2002/0077123 | A1 * | 6/2002 | Otsuka | H04W 88/02 |
| | | | | 455/456.6 |
| 2005/0197137 | A1 * | 9/2005 | Radic | G01S 19/09 |
| | | | | 455/456.1 |
| 2005/0210110 | A1 * | 9/2005 | Li | H04L 51/38 |
| | | | | 709/206 |
| 2007/0185728 | A1 * | 8/2007 | Schwarz | B60R 25/04 |
| | | | | 701/36 |

FOREIGN PATENT DOCUMENTS

| | | |
|---|---|---|
| JP | 2003064859 | 9/2003 |
| WO | 0021268 | 4/2000 |
| WO | 03071825 | 8/2003 |
| WO | 2006049603 | 5/2006 |
| WO | 2007005969 | 1/2007 |

OTHER PUBLICATIONS

Canadian Office Action dated Mar. 2, 2012 for corresponding application No. 2,641,300.
Office Action dated Jul. 29, 2011 for corresponding Canadian application No. 2,641,300.
Examination Report for corresponding European Patent Application No. 07119342.9 dated Feb. 17, 2010.
Examination report mailed for corresponding European Patent Application No. 07119342.9 dated Nov. 4, 2010.
Extended European Search Report dated Jan. 17, 2017, received for European Application No. 16188428.3.

* cited by examiner

SENDING LOCATION INFORMATION FROM WITHIN A COMMUNICATION APPLICATION

1. CROSS-REFERENCE TO RELATED APPLICATIONS

This application is a continuation of U.S. patent application Ser. No. 15/357,825, filed Nov. 21, 2016 and issued as U.S. Pat. No. 10,038,969, which is a continuation of U.S. patent application Ser. No. 14/733,518, filed Jun. 8, 2015 and issued as U.S. Pat. No. 9,503,859, which is a continuation of U.S. patent application Ser. No. 14/142,918, filed Dec. 29, 2013 and issued as U.S. Pat. No. 9,055,402, which is a continuation of U.S. patent application Ser. No. 13/665,051, filed Oct. 31, 2012 and issued as U.S. Pat. No. 8,620,583, which is a continuation of U.S. patent application Ser. No. 13/330,465, filed on Dec. 19, 2011 and issued as U.S. Pat. No. 8,315,800, which is a continuation of U.S. patent application Ser. No. 11/923,940, filed on Oct. 25, 2007 and issued as U.S. Pat. No. 8,086,398, all of which applications are fully incorporated by reference herein.

2. TECHNICAL FIELD

The present disclosure relates generally to wireless communications devices and, in particular, to wireless communications devices having Global Positioning System (GPS) receivers or other such positioning-determining capabilities.

3. BACKGROUND

Some wireless communications devices have Global Positioning System (GPS) chipsets (or external Bluetooth™ dongles) that convert radio-frequency signals received from orbiting GPS satellites into real-time coordinates of longitude and latitude that are typically accurate to within a few meters of the actual current location of the device. This current location information can be transmitted to a recipient as position coordinates (longitude and latitude), as a map, or as a URL to a map that can be downloaded and displayed used a mapping application such as BlackBerry Maps™, Google Maps™ or MapQuest™. To send location information using current technology, however, requires that the user launch a mapping application. This presents an inconvenience for the user who is already engaged within a communication application, e.g. a user who is already composing an e-mail or who is chatting on an instant messenger.

4. BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

5. DETAILED DESCRIPTION

The present technology generally provides a method, wireless communications device and computer program product that enable sending of current location information from within an e-mail application, instant messenger or other communication application.

Accordingly, an aspect of the present technology is a method in a wireless communications device for transmitting current location information representing a current location of the wireless communications device. The method entails obtaining the current location information representing the current location of the wireless communications device from within a communication application executing in the wireless communications device, including the current location information in a communication generated from within the communication application, and transmitting the communication that includes the current location information.

Another aspect of the present technology is a computer program product that includes code adapted to perform the steps of the foregoing method when the computer program product is loaded into memory and executed on a processor of a wireless communications device.

Yet another aspect of the present technology is a wireless communications device for sending current location information representing a current location of the device. The device has a GPS chipset for receiving GPS signals and for generating the current location information representing the current location of the device, a memory operatively connected to a processor for storing and executing a communication application configured to generate a communication and to cause the device to obtain current location information from the GPS chipset, and a radiofrequency transmitter for transmitting the current location information as part of the communication generated from within the communication application.

The details and particulars of these aspects of the technology will now be described below, by way of example, with reference to the attached drawings.

Figure 1:
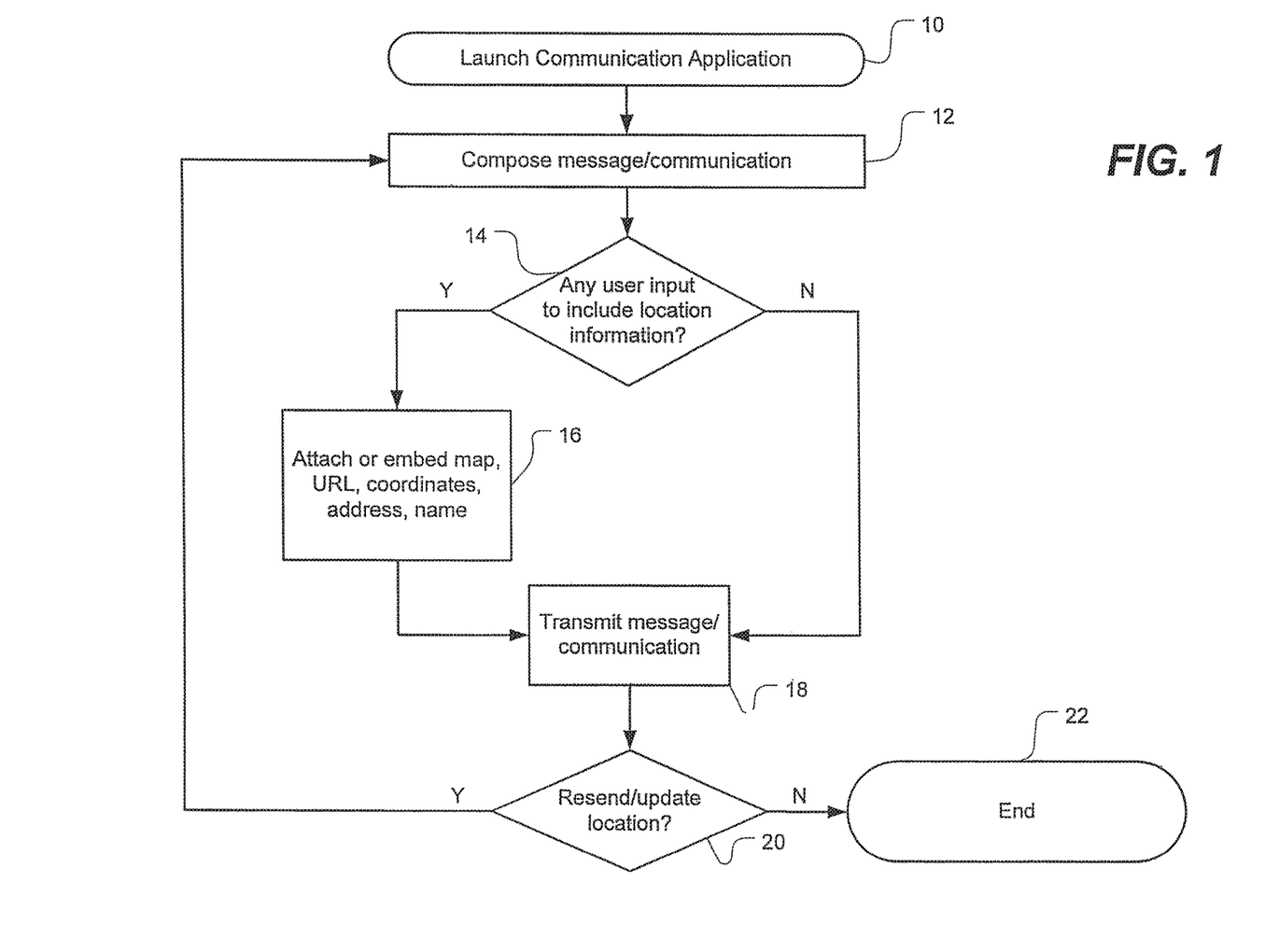
FIG. 1 is a flowchart outlining steps of a method of sending current location information from within an e-mail application, instant messenger or other communication application in accordance with implementations of the present technology.

FIG. 1 is a flowchart outlining steps in a method of enabling a user of a wireless communications device to send current location information representing a current location of the wireless communications device. As depicted in FIG. 1, an initial step 10 of this method is launching (i.e. activating or "opening") a communication application such as, for example, an e-mail application or an instant messenger. Launching the communication application can be done directly by the user or indirectly by first launching another application that, in turn, activates the communication application. Once the communication application (e.g. e-mail or instant messaging) has been launched either directly or indirectly, the present method can be used to send current location information from within the communication application. Sending location information from within a communication application is very convenient because it obviates the need to separately launch a mapping application (or other specific location-based application) for sending location information. Since the location information can be sent directly from within the communication application, the user saves both time and effort.

FIG. 1 depicts a step 12 of composing a message or communication after having launched the communication application. The user can thus attach or embed location information once he or she has begun to compose a message (or to compose a reply). It is important to note that the user can also send the location information without having actually begun "composing" the message (i.e. without having begun typing any text or having even selected a recipient email address). In other words, the user can simply include (i.e. attach or embed) the location information and then select a contact or an email (or IM) recipient for receipt of the location information. Alternatively, the user can select one his contacts, bring up the message template with the email address populated, and then attach or embed the location information. Alternatively, the user can attach or embed (i.e. "include") the location information in a reply to another person or in a message to be forwarded.

As further depicted in FIG. 1, once the user is within a communication application executing on a processor of the wireless communications device, the user can cause the wireless communications device to obtain the current location information representing the current location of the wireless communications device (step 16). This can be done by waking the GPS chipset to cause it to obtain a fresh GPS fix or by accessing recent GPS position data stored on the device. The current location information can be GPS position coordinates of longitude and latitude. Alternatively, reverse lookup (also known as "reverse geocoding") can provide a street address or the name of the occupant or business residing at that street address. Obtaining an address by reverse geocoding can be accomplished, for example, by transmitting the coordinates of longitude and latitude to a server which compares the coordinates to a road network stored in its mapping database, and then transmits back to the device an approximated address. Alternatively, obtaining an address by reverse geocoding can be done locally with a request to a mapping engine (mapping application) local to the device, provided the map data is entirely contained in the device's memory, e.g. on the device's removable memory card. The name of a person or company could potentially be inferred by looking up the entry in the device's address book corresponding to the given address, or at least one very similar to it. For example, based on position coordinates, reverse geocoding might suggest that the address is most probably e.g. 123 Main Street. The device would then search its address book for the address "123 Main Street". If such an entry exists, the name of the person or business would be extracted.

At step 16, the communication application includes the current location information in a communication (e.g. email message or instant message) generated from within the communication application. The communication can be not only an e-mail message or instant message, but also an SMS, MMS or PIN message. The current location information can be included as an attachment (e.g. a bitmap (.bmp) or JPEG (.jpg) of the mapped location). The current location information can also be included by embedding or inserting the information as text or graphics directly within the body of the communication (e.g. as text of the coordinates or street address that might take the form, for example, of a preformatted message such as "My current location at [insert timestamp] is [insert longitude and latitude] which corresponds to [insert street address] inserted at the bottom of the text portion of the portion. The user can choose to include or suppress the time of day. Time information (that gives the time at which the GPS fix was obtained) is useful for the recipient in assessing how fresh or stale the current position information actually is. Other user options could enable the user to format its position, font, size, etc, or to customize the message so that it includes the user's name or suppresses the position coordinates if the street address can be determined by a reverse lookup technique ("reverse geocoding").

At step 18, the communication that includes the current location information is transmitted. As noted above, the communication can be an e-mail, instant message, SMS, MMS or PIN message. The communication that includes the current location information thus informs the recipient of the user's current location without requiring that the user separately activate a mapping application, GPS manager or other location-based application to send the location information.

Subsequently, as shown in the method flow of FIG. 1, the device can further enable the user to send updated location information, for example, in reply to a subsequent message, by repeating the above process. The communication application can therefore be made to be responsive to a request to resend or update the location information (step 20). Alternatively, at step 20, the communication application can actively prompt or remind the user to resend a location update in reply to the next message from the same recipient (contact). The communication application can also be programmed to provide such a reminder only if a certain time has elapsed or if the device's GPS chipset detects that the device has been displaced in a given period of time in which case an update may be warranted. For example, the user could configure the device to prompt the user if the device moves more than 1 km (0.6 miles) in the ten minutes following the sending of its current location. If no further location information is to be sent, then the method ends at step 22. As another variant, the device could be configured to automatically transmit location information on request. Usually, this would require the user to grant permission to do so, for privacy reasons. For example, this would enable the sending of location updates to the recipient for the duration of the current chat session.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This novel method is preferably implemented on a wireless communications device such as the BlackBerry® by Research in Motion Limited (or on other wireless handhelds, cellular phones, wireless-enabled laptops or wireless-enabled PDAs).

Figure 2:
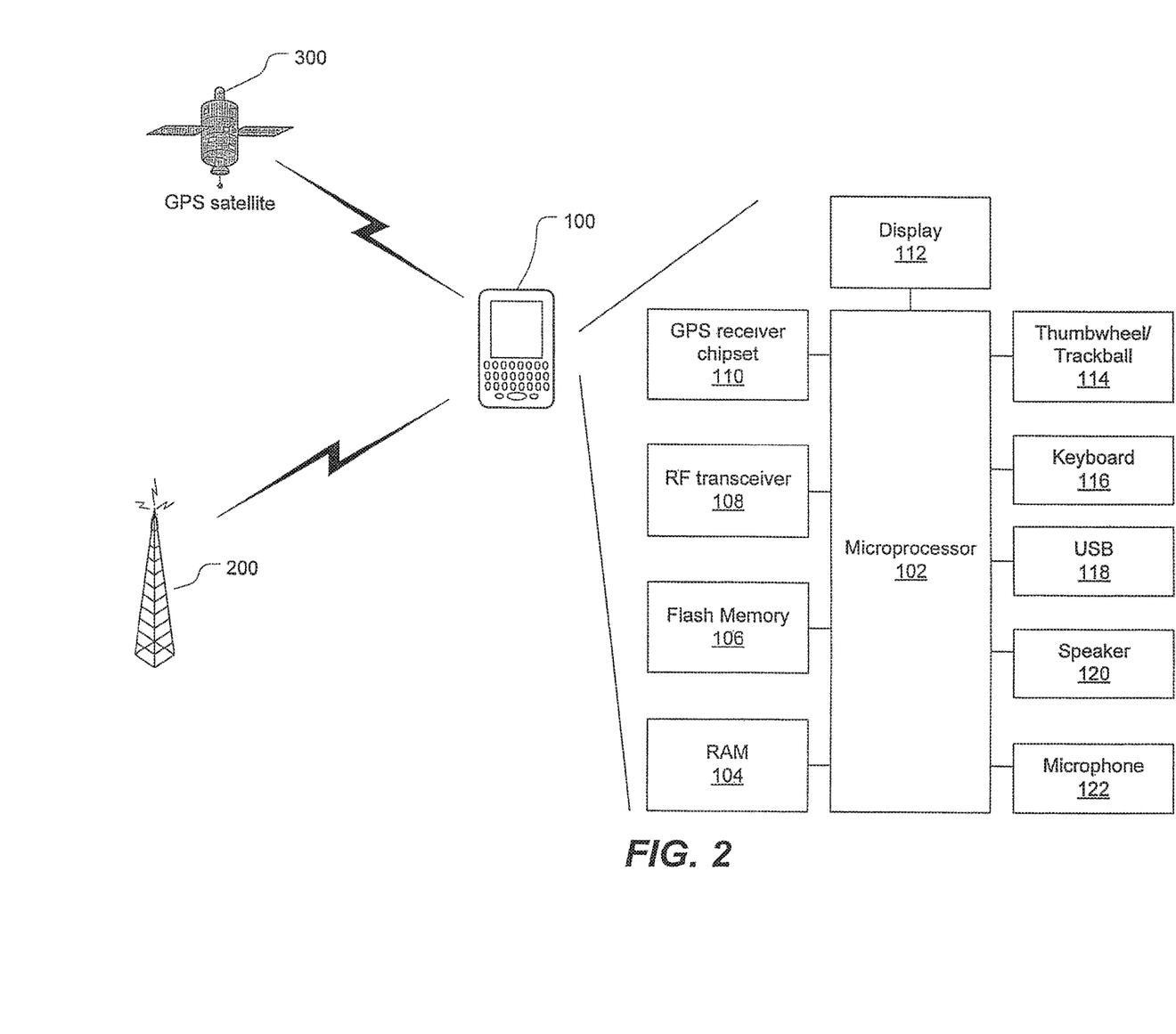
FIG. 2 is a block diagram of key components of a GPS-enabled wireless communications device on which the present technology can be implemented.
Figure 3:
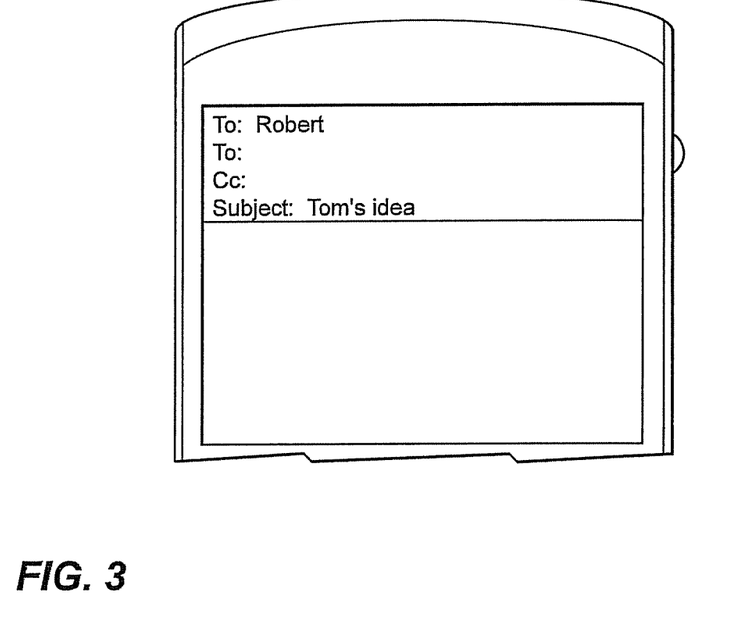
FIG. 3 illustrates an example of one type of wireless communications device on which the present technology can be implemented to enable a user to attach current location information while composing an e-mail message.

FIG. 2 is a block diagram depicting certain key components of a wireless communications device 100. It should be expressly understood that this figures is intentionally simplified to show only certain components; the device 100 of course includes other components beyond what are shown in FIG. 2. The device 100 includes a microprocessor 102 (or simply a "processor") which interacts with memory in the form of RAM 104 and flash memory 106, as is well known in the art. The device 100 includes an RF transceiver 108 for communicating wirelessly with one or more base stations 200. The device 100 includes a GPS receiver chipset 110 for receiving GPS radio signals transmitted from one or more orbiting GPS satellites 300. In terms of input/output devices or user interfaces, the device 100 typically includes a display 112 (e.g. a small LCD screen), a thumbwheel and/or trackball 114, a keyboard 116, a USB 118 or serial port for connecting to peripheral equipment, a speaker 120 and a microphone 122. The processor and memory thus enable (among other software applications) a communication application such as an e-mail application and/or an instant messenger to run on the wireless device. The communication application(s) interact with the GPS receiver 110 (GPS chipset) by receiving GPS position data either directly or indirectly from a GPS chipset manager application that executes on the device for managing the GPS receiver hardware and for (optionally) storing recent GPS position data from recent GPS fixes.

FIGS. 3 to 11 illustrate operation of the present technology on a typical wireless communications device. In the examples presented with reference to FIGS. 3 to 11, a user wishes to include (i.e. attach or embed) current location information (in one format or another) in an e-mail message that he is composing to a recipient. As illustrated in this example, the user begins composing an e-mail message to a recipient ("Rob") with regard to a subject "Tom's idea") by filling in the "To:" and "Subject:" fields in the usual manner.

Figure 4:
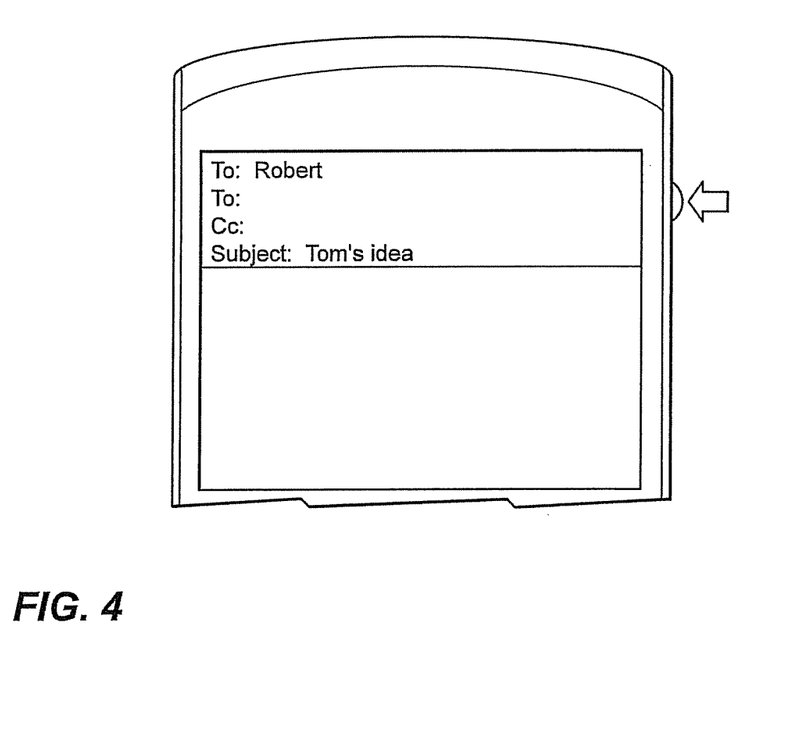
FIG. 4 shows, by way of example, how a dedicated hotkey can be triggered while composing an e-mail message to enable the user to attach location information.

FIG. 4 shows, by way of example, how a dedicated hotkey can be triggered while composing an e-mail message to enable the user to attach location information. In this particular example, a button on the side of the device is depressed, although it should be expressly understood that any other key, combination of keys or any other user input including voice commands) could be utilized to trigger the location-inclusion functionality of the device.

Figure 5:
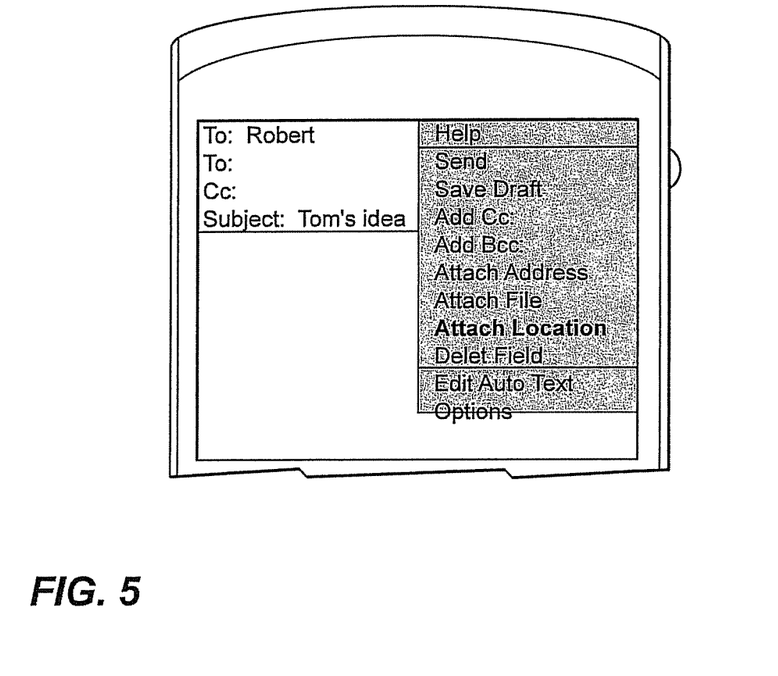
FIG. 5 shows, by way of example, a drop-down menu triggered by the hotkey that presents a variety of message-related options to the user, including an option to "Attach Location"

FIG. 5 shows, by way of example, a drop-down menu triggered by the hotkey that presents a variety of message-related options to the user, including an option to "Attach Location". The drop-down menu is presented merely by way of example, i.e. the particular choices/options in the menu and the precise wording ("Attach Location") are merely meant to be illustrative of one way of providing this feature on a wireless device. The "Attach Location" feature in this particular example is meant to encompass both the providing of location information as an actual attachment to the e-mail message and the insertion or embedding of location information directly into the body of the message.

Where a distinction is to be made between attaching and inserting, a more generic feature label such "Include Location", "Send Location", "Provide Location", "Share Location", etc., may be used. In that case, the menu choice "Include Location" (or Send/Provide/Share Location) may be further bifurcated or subdivided into further sub-choices as to whether to "Attach Location" (as an actual attachment) or whether to "Insert Location" by embedding the location directly within the body of the message. Further options could be presented to allow the user to pick the actual format of the current location information, i.e. whether to send coordinates, a pre-generated map (e.g. a bitmap, JPEG, etc.) or a hyperlinked URL to enable the recipient to download the map by simply clicking on the hyperlinked URL. These could be presented as further branches in the menu or alternatively as configurable settings in an options page (to be discussed in greater detail below with regard to FIG. 12).

Figure 6:
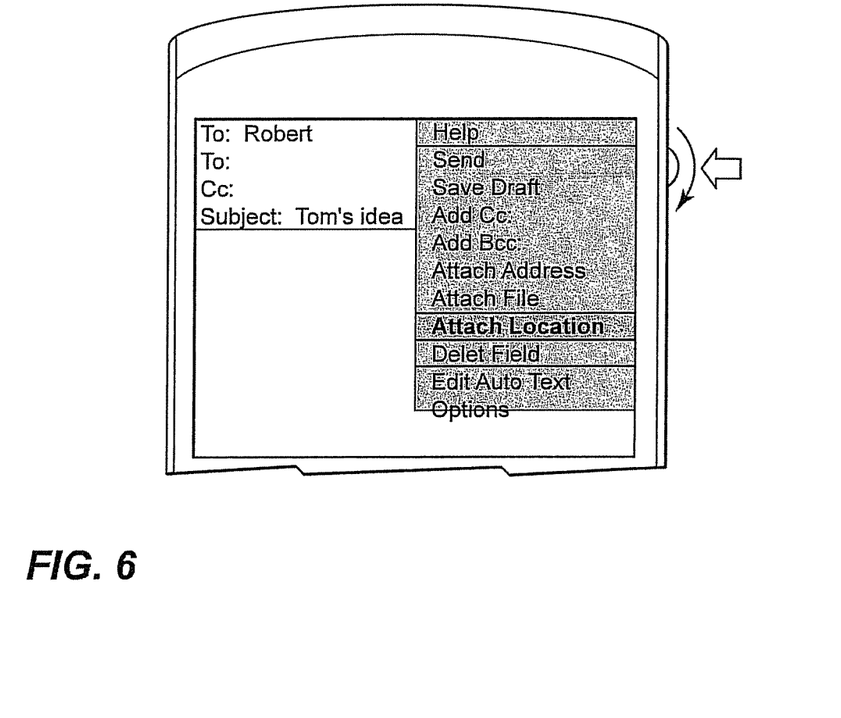
FIG. 6 shows, by way of example, how a user can roll a thumbwheel to scroll down to the "Attach Location" option to cause the device to obtain and attach (or embed) current location information.

FIG. 6 shows, by way of example, how a user can roll a thumbwheel to scroll down to the "Attach Location" option to cause the device to obtain and attach (or embed) current location information. In this example, the user rolls the thumbwheel to the "Attach Location" option and then depresses the thumbwheel to select this option. As noted previously, this feature can be activated with other user inputs (other hotkeys, key combos, trackball, touch pad, touch screen, voice commands, etc., depending on the user interface of the particular device).

Figure 7:
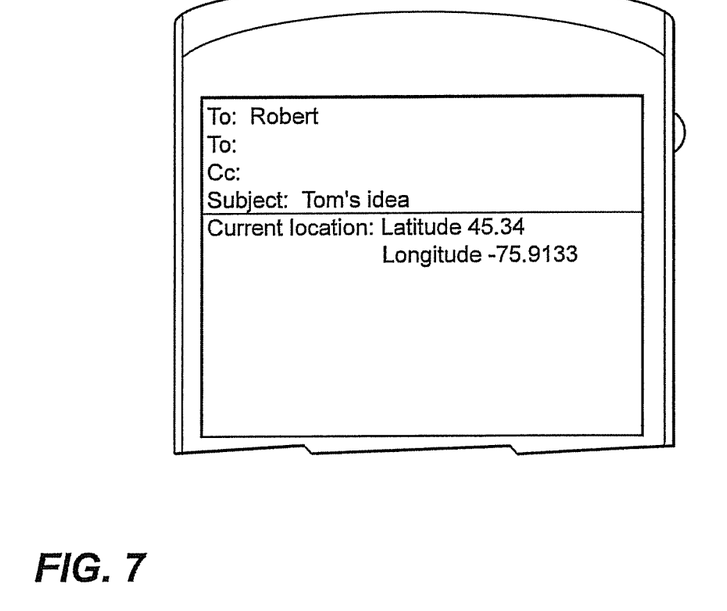
FIG. 7 shows, by way of example, that current location information expressed in terms of latitude and longitude can be embedded directly into the body of the e-mail message.
Figure 8:
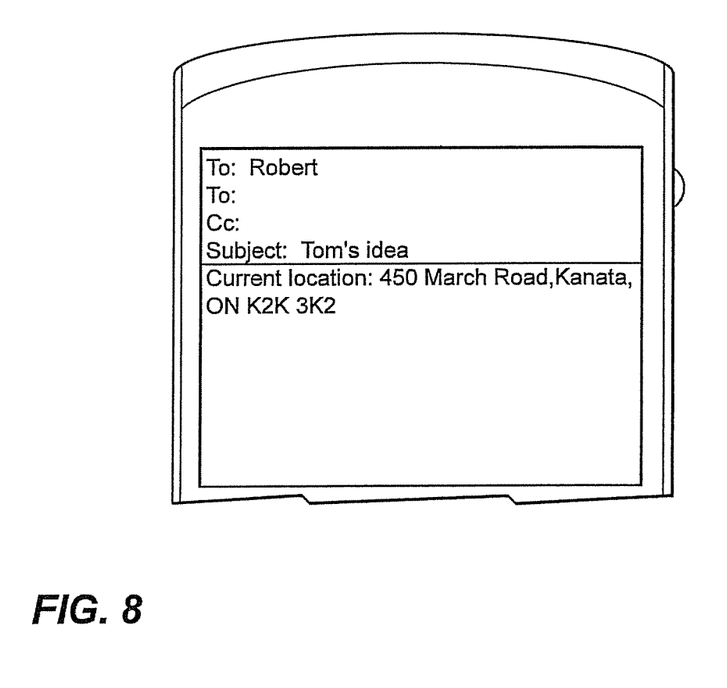
FIG. 8 shows, by way of example, how reverse lookup (reverse geocoding) can be used to embed a street address corresponding to the current location.
Figure 9:
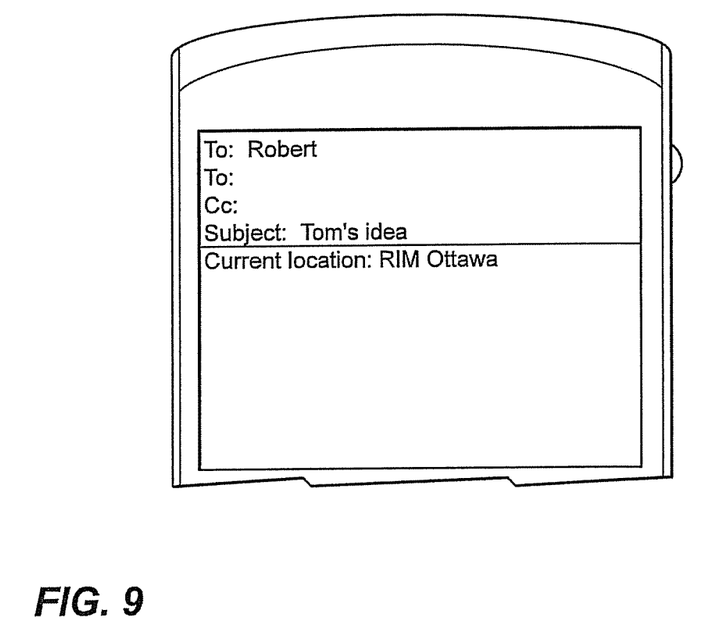
FIG. 9 shows, by way of example, how reverse lookup (reverse geocoding) can be used to embed a name of a business corresponding to the current location.
Figure 10:
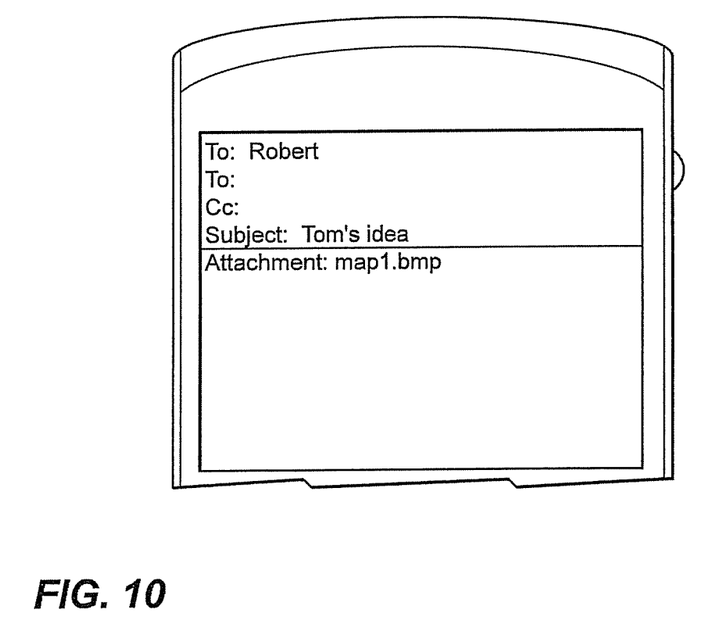
FIG. 10 shows, by way of example, that a bitmap representing a map of the current location can be attached to the e-mail as an attachment.
Figure 11:
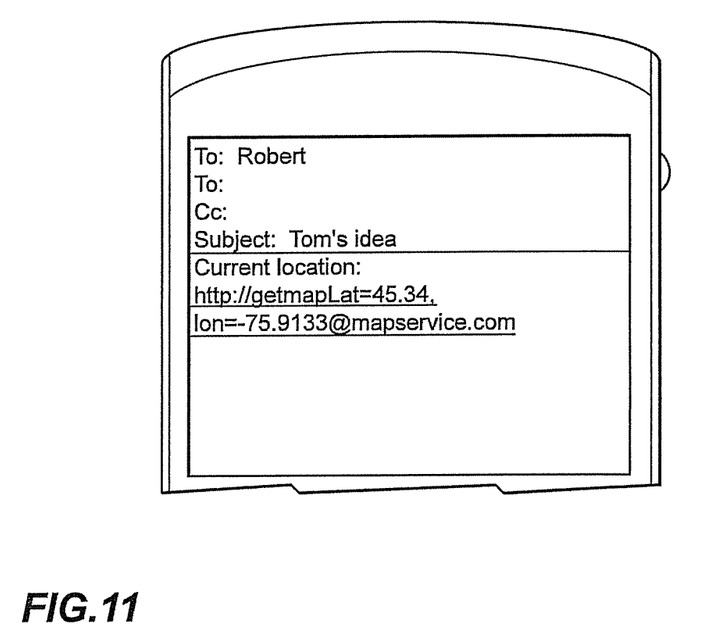
FIG. 11 shows, by way of example, that a hyperlinked URL can be inserted into the body of the e-mail message to enable the recipient to download a map of the current location.

FIG. 7 shows, by way of example, that current location information expressed in terms of latitude and longitude can be embedded directly into the body of the e-mail message. The format/presentation can be configurable or customizable by the user of the device. Since the coordinates are usually not that meaningful taken alone, equivalent address information may be presented by using a mapping application and/or address book, geographical information database, etc. that enables a reverse lookup or reverse geocoding. For example, reverse geocoding of Latitude 45.34, Longitude −75.9133 would provide a street address of 450 March Rd., Kanata, ON K2K 3K2. This information could be inserted into the body of the message as shown in FIG. 8. Alternatively, the street address can be attached as a text attachment. As a further refinement, the street address can be supplemented or replaced (again using reverse geocoding) with the name of the person, business or establishment that is resident at that street address, as shown in FIG. 9. In this particular example, the business name "RIM Ottawa" can be embedded into the message as text or attached as an attachment. FIG. 10 shows, by way of example, that a bitmap representing a map of the current location can be attached to the e-mail as an attachment. The map can be in any number of formats, such as .bmp, .jpg, etc. The map would preferably include a visual marker or icon (e.g. an arrow, crosshairs, etc.) showing the current location of the user on the map. Rather than sending a pre-generated map, the user can choose to send a hyperlinked URL, as shown in FIG. 11, which can be inserted into the body of the e-mail message to enable the recipient to download a map of the current location.

The foregoing examples demonstrate a number of aspects of this technology but it should be understood that the user need not be within an email application to make use of this technology since any other communication application can be used instead, for example, instant messenger, SMS, MMS or PIN messaging.

Figure 12:
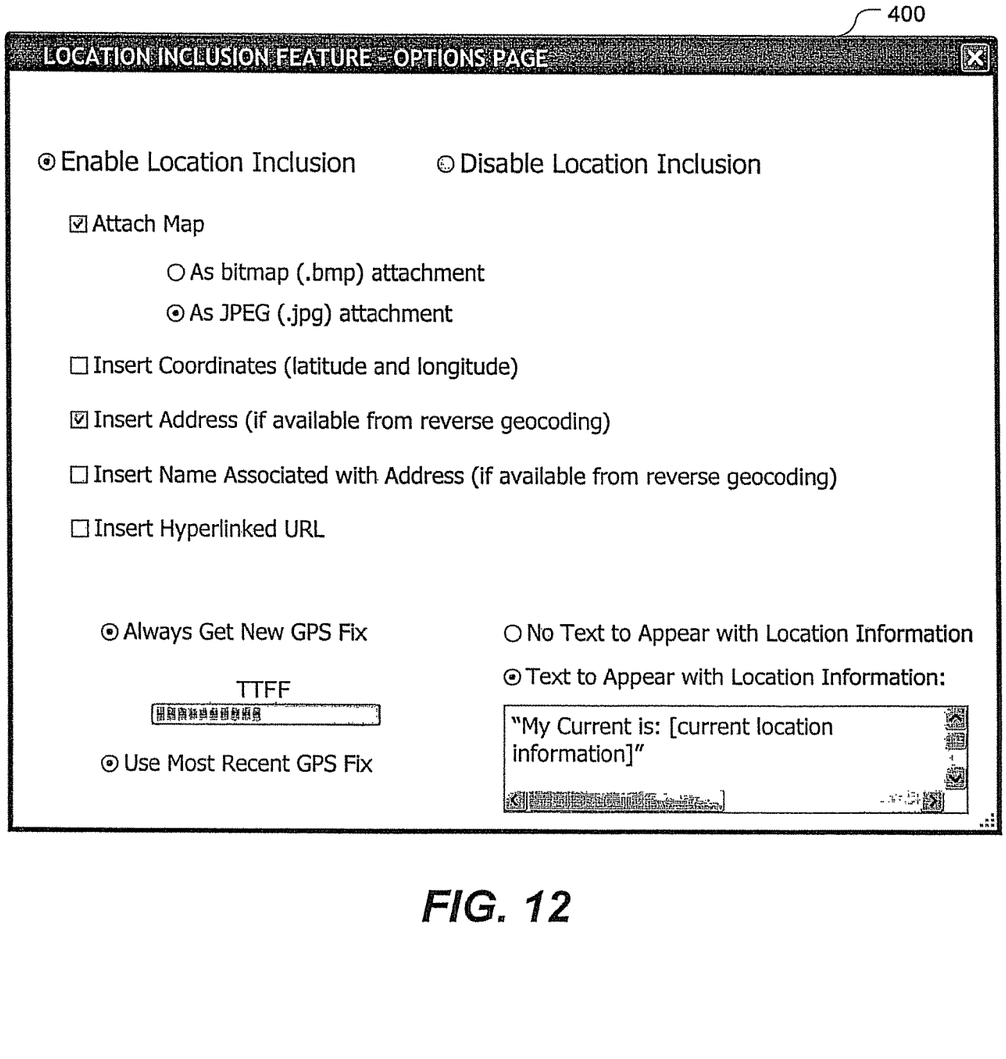
FIG. 12 shows, an options page within a communication application for enabling the user to configure settings and preferences for modifying the functionality of the "Attach Location" feature depicted in the previous figures.

FIG. 12 shows, an options page 400 within a communication application, such as an e-mail application or instant messenger, for enabling the user to configure settings and preferences for modifying or customizing the functionality of the location-inclusion feature described above with regard to the previous figures. This options page 400 is provided merely by way of example, to show various possible options that can be configured by the user. For example, the options page 400 may contain a toggle to enable or disable the location-inclusion feature.

The options page 400 may also enable the user to include the location information in one or more of a variety of different formats. For example, the options page 400 shown in this particular example has a plurality of check boxes to enable the user to configure the communication application to attach the map (for example, either as a bitmap or JPEG), to insert coordinates (in terms of longitude and latitude), to insert an address obtained using reverse geocoding (reverse lookup), to insert a name (person, business, organization or establishment) associated with the address, again if available from reverse geocoding), and/or to insert a hyperlinked URL to enable the recipient of the communication to download a map showing the current location of the device. Note that the user can optionally check more than one check box, so that the user configures the application to send current location information in more than one format. For example, the user could configure the application to attach a map and also send the street address embedded as text within the body of the message when the "Attach Location" feature is triggered.

As further depicted in FIG. 12, the options page 400 may further include settings that permit the user to configure the communication application to determine the current location information based on a new GPS position fix in the case that GPS reception is presently unavailable (e.g. the GPS receiver is off or its signal reception is lost), in which case a delay is to be expected while the device wakes its GPS chipset to get a new position fix (e.g. a "cold start" or a "warm start"). A progress bar (labelled in this example "Acquisition Progress") shows how the acquisition of the new position fix is progressing (time to first fix, or TIFF, for the cold or warm start). Alternatively, the user can configure the application to use the most recently obtained position fix (where the GPS receiver has been shut off or where interference precludes the reception of GPS signals). In the scenario where the GPS unit is off or where the GPS chipset is unable to receive signals, the user can configure the application to include current location information in a communication by retrieving the most recent GPS fix from memory and using that position fix as the most "current" location. A further setting (not shown) would enable the user to specify a maximum age for the recent position fix to limit the potential inaccuracy of the result. In other words, the user could, for example, specify that no stored GPS fix older than 10 minutes be used. For example, if the user travels through a long tunnel and loses GPS signal reception, the device would not send the location information after ten minutes have elapsed because the fix has gone stale. A new position fix would then have to be obtained before transmitting the current location information in the message.

In another implementation of this technology, the user can trigger the generation and sending of a message while engaged in a voice call by exploiting the separate voice and data channels on the wireless communications device. This implementation could, for example, use a dedicated hotkey (such as the side button shown in the preceding figures or any other key or combination of keys) to launch an application that automatically generates a message (e.g. an e-mail, SMS, MMS or the like) by auto-populating the e-mail address from the user's address book by correlating the telephone number of the voice call underway with a particular contact in the address book and then pulling the e-mail address associated with that phone number (or contact) into the e-mail recipient's field. The application would then, for example, attach or embed into the e-mail or other datagram-based message the current location information which would then be transmitted automatically via the device's wireless transceiver to the party with whom the user is talking (thereby enabling the recipient to receive the current location information). Because of the separate voice and data channels, the call would continue unaffected by the transmission of the location information. This implementation would be useful in a number of situations, such as, for example, the scenario where two individuals are talking on their wireless devices and one wishes to send a map of his current location to the other without having to interrupt the telephone discussion.

In yet another implementation, the communication application can be further configured to enable the user to transmit the current location information as well as recent path information delineating a recent path taken by the user, the recent path information being determined based on recent location fixes for the device. In certain cases, the user may wish to send to the recipient not just his or her current location but also the route or path that he or she has taken. This feature would thus enable user to provide the path or route plotted out on a map (or alternatively a set of waypoints in coordinate form or in street address form). Alternatively, the map could have bubble captions showing the addresses of the various waypoints along the route.

Although GPS (Global Positioning System) represents the preferred manner of obtaining location information for a mobile device, it should be appreciated that other techniques could be used in lieu of, or in addition to, GPS coordinates. The location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Coarser location information can be obtained not only be triangulating the device's position based on nearby cell towers but also based on nearby Wi-Fi access points via the WLAN radio.

This new technology has been described in terms of specific implementations and configurations which are intended to be exemplary only. The scope of the exclusive right sought by the Applicant is therefore intended to be limited solely by the appended claims.

The invention claimed is:

1. A method in a wireless communications device for transmitting current location information representing a current location of the wireless communications device, the method comprising:
   obtaining the current location information representing the current location of the wireless communications device from within a communication application executing in the wireless communication device;
   including the current location information in a communication generated from within the communication application; and transmitting the communication that includes the current location information.

2. The method as claimed in claim 1 further comprising: performing a reverse look-up of GPS coordinates representing the current location to determine address information for including in the communication.

3. The method as claimed in claim 1 further comprising: transmitting one or more of:
- a set of position coordinates;
- a street address;
- a name associated with the street address;
- a map; and
- a URL to a map.

4. The method as claimed in claim 1 further comprising: performing a reverse look-up of GPS coordinates representing the current location to determine address information and a name associated with the street address for including as an attachment to an e-mail message.

5. The method as claimed in claim 1, wherein obtaining the current location information further comprises:
receiving input from a hotkey during a voice call to trigger automatic generation and transmission of a text message containing the current location information.

6. The method as claimed in claim 1 further comprising: transmitting the current location information as well as recent path information delineating a recent path taken, the recent path information being determined based on recent location fixes for the device.

7. A computer program product comprising code which, when loaded into memory and executed on a processor of a wireless communications device, is adapted to perform the steps of:
causing the wireless communications device to obtain the current location information representing the current location of the wireless communications device from within a communication application executing on the processor of the wireless communications device;
including the current location information in a communication generated from within the communication application; and
transmitting the communication that includes the current location information.

8. The computer program product as claimed in claim 7 wherein the code further performs a step of performing a reverse look-up of GPS coordinates representing the current location to determine address information for including in the communication.

9. The computer program product as claimed in claim 7 wherein the code further performs a step of transmitting one or more of:
- a set of position coordinates;
- a street address;
- a name associated with the street address;
- a map; and
- a URL to a map.

10. A wireless communications device for sending current location information representing a current location of the device, the device comprising:
a GPS chipset for receiving GPS signals and for generating the current location information representing the current location of the device;
a memory operatively connected to a processor for storing and executing a communication application configured to generate a communication and to cause the device to obtain current location information from the GPS chipset; and
a radio frequency transmitter for transmitting the current location information as part of the communication generated from within the communication application.

11. The wireless communications device as claimed in claim 10 wherein the communication application is further configured to perform a reverse look-up of GPS coordinates representing the current location to determine address information for including into the communication.

12. The wireless communications device as claimed in claim 10 wherein the communication application is configured to transmit one or more of:
- a set of position coordinates;
- a street address;
- a name associated with the street address;
- a map; and
- a URL to a map.

13. The wireless communications device as claimed in claim 10 wherein the communication application is further configured to perform a reverse look-up of GPS coordinates representing the current location to determine address information and a name associated with the street address for including as an attachment to an e-mail message.

14. The wireless communications device as claimed in claim 10 further comprising a hotkey for triggering, during a voice call, automatic generation and transmission of a text message containing the current location information.

15. The wireless communications device as claimed in claim 10 wherein the communication application is further configured to transmit the current location information as well as recent path information delineating a recent path taken, the recent path information being determined based on recent location fixes for the device.

* * * * *